US008353073B2

United States Patent
Noffsinger et al.

(10) Patent No.: US 8,353,073 B2
(45) Date of Patent: Jan. 15, 2013

(54) BRUSH ARRANGEMENT FOR A CARWASH FACILITY

(75) Inventors: Luke Noffsinger, Brighton, CO (US); Harald Bender, Königsbrunn (DE)

(73) Assignee: Washtech Holding GmbH, Augsburg (DE)

( * ) Notice: Subject to any disclaimer, the term of this patent is extended or adjusted under 35 U.S.C. 154(b) by 518 days.

(21) Appl. No.: 12/665,764

(22) PCT Filed: Oct. 30, 2008

(86) PCT No.: PCT/EP2008/064755
§ 371 (c)(1),
(2), (4) Date: Dec. 21, 2009

(87) PCT Pub. No.: WO2009/065715
PCT Pub. Date: May 28, 2009

(65) Prior Publication Data
US 2010/0199446 A1    Aug. 12, 2010

(30) Foreign Application Priority Data

Nov. 24, 2007  (DE) .......................... 10 2007 056 701

(51) Int. Cl.
*B60S 3/00* (2006.01)
(52) U.S. Cl. .................. 15/53.3; 15/53.2; 15/DIG. 2
(58) Field of Classification Search ................. 15/53.3, 15/53.2, DIG. 2
See application file for complete search history.

(56) References Cited

U.S. PATENT DOCUMENTS

| | | | | |
|---|---|---|---|---|
| 4,354,291 A | * | 10/1982 | Ennis .............................. | 15/53.3 |
| 4,962,560 A | | 10/1990 | Moore | |
| 5,715,558 A | | 2/1998 | Johnson | |
| 5,813,077 A | * | 9/1998 | Belanger et al. ............... | 15/97.3 |
| 6,042,292 A | | 3/2000 | Belanger et al. | |
| 2003/0051302 A1 | | 3/2003 | Fazio | |

OTHER PUBLICATIONS

International Search Report published May 28, 2009 for PCT/EP2008/064755 filed Oct. 30, 2008.
International Preliminary Report published Jun. 8, 2010 for PCT/EP2008/064755, filed Oct. 30, 2008.
Written Opinion published Jun. 8, 2010 for PCT/EP2008/064755, filed Oct. 30, 2008.

* cited by examiner

*Primary Examiner* — Shay Karls
(74) *Attorney, Agent, or Firm* — Martin Fleit; Paul D. Bianco; Fleit Gibbons Gutman Bongini & Bianco PL

(57) ABSTRACT

The invention relates to a brush arrangement for a carwash facility, comprising at least one horizontal cross-beam (1), on which at least one support arm (2) is pivotally supported in the horizontal plane, wherein at one end of the support arm (2) an articulated joint (4) is provided, which is pivotally articulated at the upper end thereof about a horizontal articulated axis (5) on the support arm (2) and at the lower end thereof a washing brush (6) is pivotally supported about a horizontal brush pivot axis (7). It is provided according to the invention that the articulated axis (5) and the brush pivot axis (7) enclose an angle of 30° to 60° in order to configure such a brush arrangement such that the corner regions of the vehicles can thus also be cleaned satisfactorily. The invention also relates to a method for cleaning a vehicle in a carwash facility using a brush arrangement according to the invention.

17 Claims, 4 Drawing Sheets

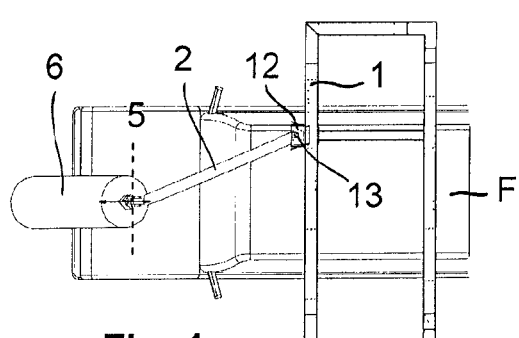 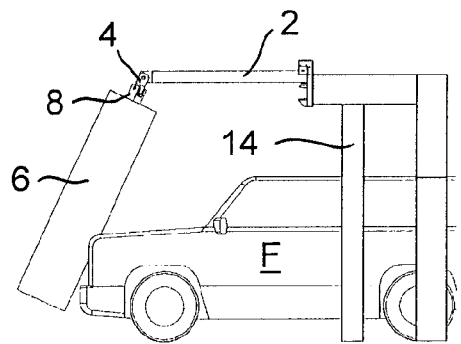
Fig. 1a     Fig. 1b
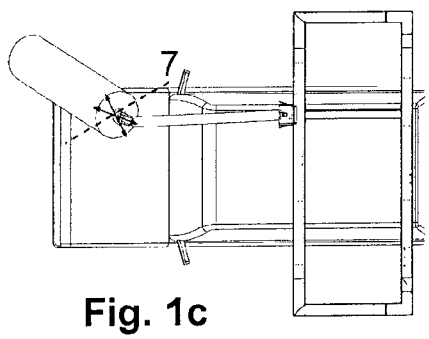 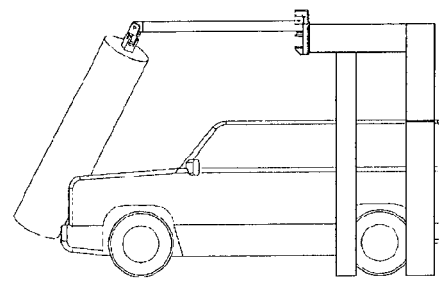
Fig. 1c     Fig. 1d
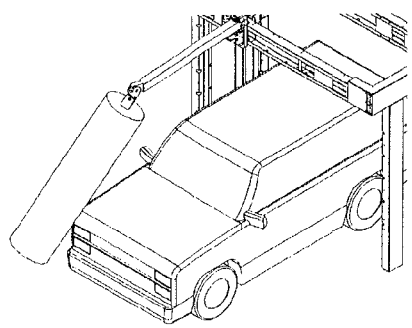 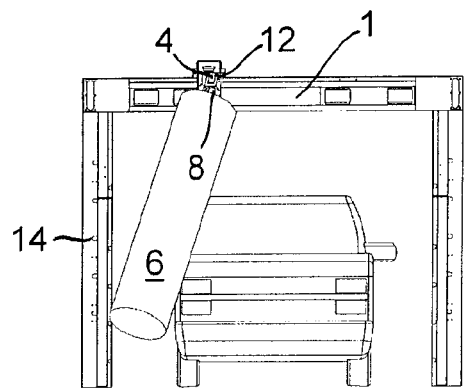
Fig. 1e     Fig. 1f

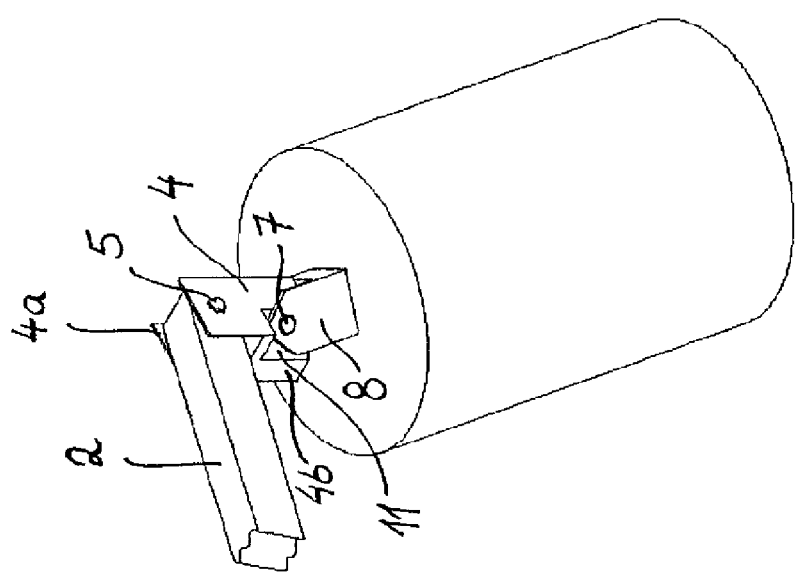

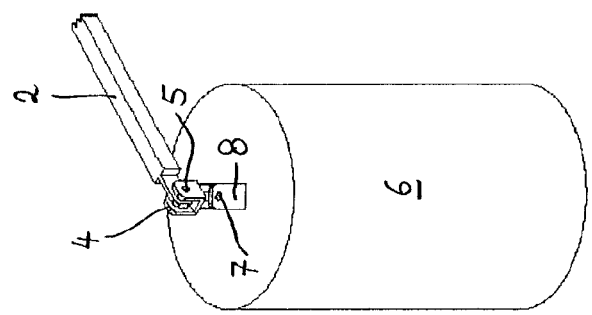
Fig. 3a
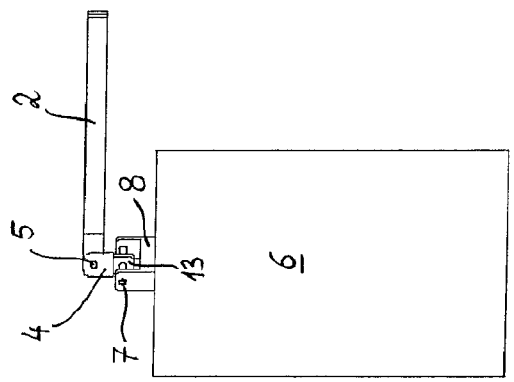
Fig. 3b
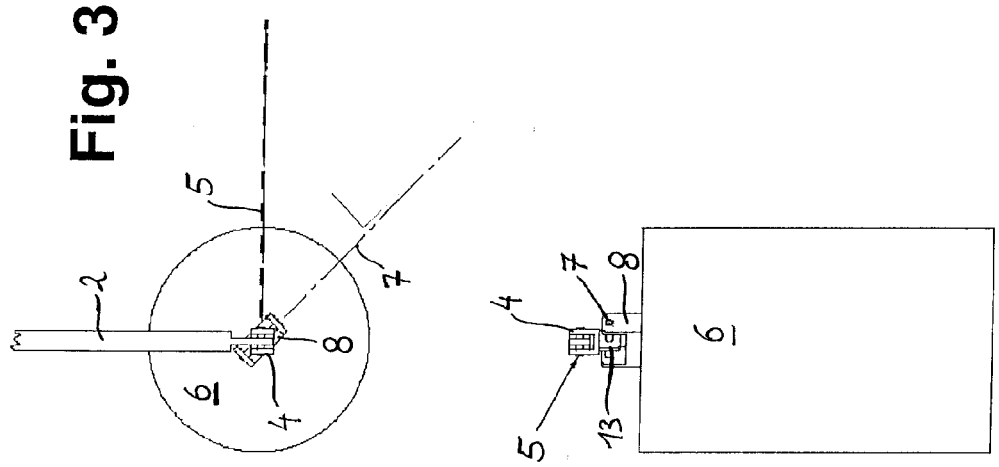
Fig. 3d
Fig. 3c

BRUSH ARRANGEMENT FOR A CARWASH FACILITY

FIELD OF THE INVENTION

The invention relates to a brush arrangement for a car wash facility.

BACKGROUND OF THE INVENTION

U.S. Pat. No. 5,715,558 discloses a generic brush arrangement for a car wash facility. It comprises a horizontally arranged crossbeam on which a carrier arm is mounted so that it can pivot about a vertical axis. On the free end of the carrier arm, an articulated connection is articulated in such a manner that it can pivot on its upper end about a horizontal pivot axis. On the lower end of the articulated connection, a brush carrier for a wash brush is arranged in such a manner that it can pivot about a horizontal brush carrier pivot axis, which horizontal brush carrier pivot axis is perpendicular to the horizontal pivot axis of the articulated connection. A wash brush with a brush shaft is rotatably arranged on the brush carrier and driven by a motor fastened to the brush carrier. The horizontal articulation axis enables a front and back pivoting movement of the articulated connection along the direction of travel of the vehicle driving into the car wash facility. The brush pivot axis arranged horizontally to the articulation axis enables pivoting out of the brush carrier perpendicular to the direction of travel of the vehicle driving into the car wash facility.

However, this known brush arrangement has disadvantages during the transition of the rotating wash brush from the front of the vehicle to be cleaned to its side areas, and during the transition from the side areas to the rear part of the vehicle. In these transitional areas, the rotating wash brush does not lie closely enough against the corners of the vehicle, for which reason these corner areas are not satisfactorily cleaned.

SUMMARY OF THE INVENTION

Starting from the above, the invention has the problem of further developing a generic brush arrangement in such a manner that even the corner areas of the vehicles can be satisfactorily cleaned with this brush arrangement.

This problem is solved with a brush arrangement with at least one horizontal crossbeam on which at least one carrier arm is mounted so that it can pivot in a horizontal plane, in which an articulated connection is provided on one end of the carrier arm, which connection is articulated on its upper end in such a manner that it can pivot about a horizontal articulation axis on the carrier arm, and a wash brush is mounted on its lower end in such a manner that it can pivot about a horizontal brush pivot axis, which articulation axis and the brush pivot axis enclose an angle of 30-60°. Contrary to the generic brush arrangement, in which the articulation axis and the brush pivot axis are perpendicular to one another, the smaller angle between the articulation axis and the brush pivot axis makes it possible for the rotating wash brush to rest as closely as possible against the vehicle surface even in the corner areas of the vehicle. This is achieved because the carrier arm in the position in which the wash brush reaches a corner area of the vertical forms an angle of approximately 90-120° from the horizontal crossbeam and because, during the transition of the rotating wash brush from the vertical front to its side surfaces in this position of the carrier arm, the wash brush hanging on a brush carrier can freely move in the direction of the movement of the vehicle driving into the car wash facility as well as in a direction transverse to it and can thus rest closely against the vehicle surface.

BRIEF DESCRIPTION OF THE DRAWINGS

Preferred embodiments of the brush arrangement are explained in detail using an embodiment example with reference to the accompanying drawings.

FIG. 1a shows a top view of a car wash facility with a brush arrangement in accordance with the invention, which brush arrangement is shown in a start position of the washing process.

FIGS. 1b-1m show views of different sequences in chronological succession during the cleaning process of the invention, in which FIGS. 1b, 1d and 1l show the car wash facility in a lateral view, FIGS. 1c, 1j, 1k and 1m show it in a top view, FIGS. 1f and 1g in a front view and FIG. 1e in a perspective view.

FIG. 2 shows a detailed perspective view of a first embodiment of the articulated connection of the brush arrangement in accordance with the invention.

FIG. 3 shows detailed perspective view of a second embodiment of the articulated connection of the brush arrangement in accordance with the invention (FIG. 3a), a lateral view (FIG. 3b), a front view (3c) and a top view (FIG. 3d).

DETAILED DESCRIPTION OF THE INVENTION

Figure 1G:
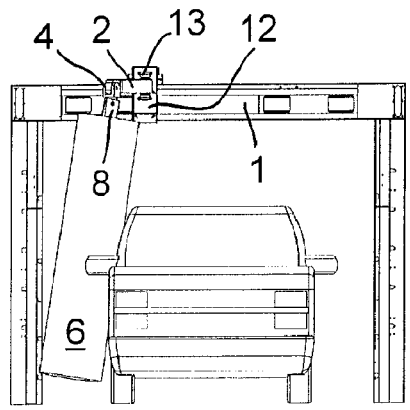

FIGS. 1a and 1b show a brush arrangement for a car wash facility in accordance with the invention in a top view together with a vehicle F to be cleaned that is driving into the car wash facility. The brush arrangement comprises a horizontally arranged crossbeam 1 carried by vertical posts sketched in FIG. 1b. A carrier arm 2 is pivotably mounted on crossbeam 1. To this end, the one arm of carrier arm 2 is articulated to a pivot bearing 12 fastened on crossbeam 1 and can pivot about a vertical carrier arm axis 13 in a horizontal plane. Pivot bearing 12 is offset toward the outside on crossbeam 1 from the central axis (longitudinal axis) of the car wash facility approximately by one-fourth of a vehicle width. An articulation connection 4 is pivotably articulated to the free end of carrier arm 2. Articulation connection 4 can be seen in the side view of the brush arrangement of FIG. 1b. Articulation connection 4 is pivotably articulated on its upper end on carrier arm 2 via an articulation axis 5. A brush carrier 8 is pivotably mounted on the lower end of articulation connection 4 and a wash brush 6 is rotatably fastened on brush carrier 8. If no vehicle is present in the car wash facility, the cylindrical wash brush, that preferably comprises washing elements of foamed plastic or textile material, hangs freely downward.

A car wash facility is preferably equipped with two or more such brush arrangements that are arranged at a distance from each other in the longitudinal direction of the car wash facility. In order to clean a vehicle F, it is driven through the car wash facility in the forward or in the reverse direction. Alternatively, the brush arrangement can be arranged on movable portals that are then moved past the standing vehicle in the longitudinal direction.

FIG. 2 shows a first embodiment of articulated connection 4 in a detailed perspective view. In this embodiment, articulated connection 4 has a U-shaped upper part and a lower part 4b arranged on it in one piece, which U-shaped upper part 4a surrounds the free end of carrier arm 2 and is articulated via a bolt in such a manner that it can pivot there about articulated axis 5. Lower part 4b has pivot surfaces 11 running obliquely at an angle of 30-60°, preferably smaller than 45°, to the shanks of U-shaped upper part 4a, on which surfaces the upper end of brush carrier 8 is articulated in such a manner that it can pivot via a bolt about a brush pivot axis 7. Articulation axis 5, about which articulated connection 4 can pivot, and brush pivot axis 7, about which brush carrier 8 can pivot, enclose an angle of 30-60° with one another in this manner. The articulation connection is preferably designed in such a manner that articulation axis 5 encloses an angle of 45° with brush pivot axis 7. Brush carrier 8 is designed to be U-shaped on its upper side, and the U shanks of brush carrier 8 surround lower part 4b of articulation axis 4 and rest on pivot surfaces 11, where they are articulated and can pivot via a bolt on lower part 4b of articulated connection 4.

The function of the previously described brush arrangement is described in the following process for cleaning a vehicle in a car wash facility, with reference made to FIGS. 1a-1m.

FIG. 1a shows a car wash facility with a brush arrangement in accordance with the invention in its basic position. Carrier arm 2 with wash brush 6 hanging on it is in its base position, in which it encloses an angle of approximately 70-80° with crossbeam 1. The wash brush hangs in front of the vehicle to be cleaned and is arranged transversely to the direction of travel in approximately the middle or in the outer third of the vehicle. If a vehicle F drives into the car wash facility, its front bumps against hanging wash brush 6 and moves it forward in the direction of movement of the vehicle (FIG. 1b). At this time, articulated connection 4 is pivoted forward about horizontal articulation axis 5. As, for example, F drives in further, the rotating wash brush travels along the front of vehicle F toward its side area, during which brush carrier 8, on which wash brush 6 is arranged, is pivoted slightly outward about brush pivot axis 7 (FIGS. 1c and 1d). The pivoting of brush carrier 8 about brush pivot axis 7 takes place at an angle of 30-60° to articulation axis 5. When wash brush 6 reaches the corner area of vehicle F, brush carrier 8 is pivoted further outward about brush pivot axis 7 (FIG. 1e). During the movement of rotating wash brush 6 along the front of vehicle F, carrier arm 2 is pivoted out of its base position into the side position visible in FIG. 1c, in which carrier arm 2 is approximately perpendicular to crossbeam 1.

Figure 1J:
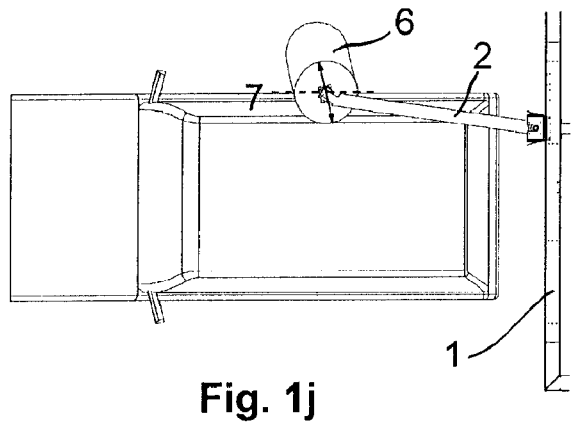
Figure 1K:
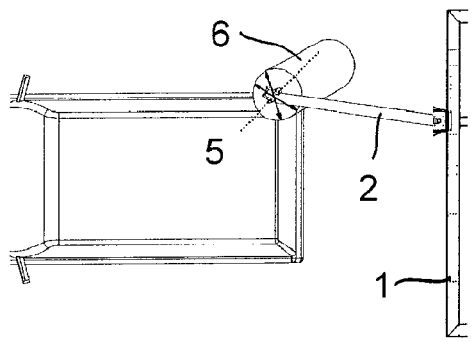
Figure 1L:
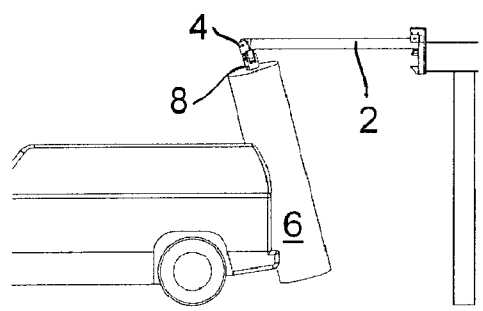
Figure 1M:
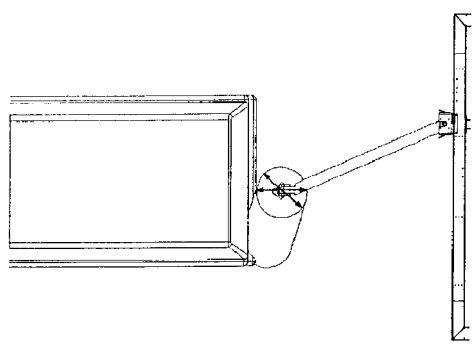

As vehicle F drives further, rotating wash brush 6 slides around the front corner of the vehicle, during which wash brush 6 rests at all times closely against the vehicle surface even in the corner area of the vehicle, for example, on account of its mobility about articulation axis 5 and the brush pivot axis 7 standing at an angle of 30-60° to it (FIGS. 1e and 1f). When wash brush 6 has run completely around the front corner of the vehicle, the carrier arm then encloses an angle of somewhat more than 90°, e.g., approximately 120°, with the crossbeam (as FIG. 1j shows), and as vehicle F moves further, wash brush 6 slides along its side surface (FIGS. 1g and 1j). At this time, brush carrier 8 with wash brush 6 rotatably arranged on it can pivot about brush pivot axis 7 in the transverse direction, that is, perpendicular to the direction of movement of the vehicle. As a result, rotating wash brush 6 can follow the side contour of the vehicle at all times closely against the side surface of the vehicle along the entire vehicle length as the vehicle moves farther through the car wash facility. When rotating wash brush 6 reaches the rear corner area of the vehicle, wash brush 6 moves around the rear corner of the vehicle, during which the articulated connection pivots to the rear and inward about articulation axis 5 (FIG. 1k). At the same time, carrier arm 2 on crossbeam 1 pivots back into its central position while wash brush 6 slides inward along the rear of the vehicle. During the sliding of the rotating wash brush along the vehicle rear, wash brush 6, hanging on articulated connection 4, can oscillate back and forth in the direction of travel of the vehicle, thus adapting to the rear contour of the vehicle (FIG. 1m). As soon as wash brush 6 has lost contact with the rear of vehicle F as it travels farther, articulated connection 4 pivots about articulation axis 5 and brush carrier 8 pivots about brush pivot axis 7 back into its start position in which wash brush 6 hangs freely downward.

The relationship of articulation axis 5 and of brush pivot axis 7 to one another ensures during the entire course of the movement of rotating wash brush 6 about the vertical vehicle surfaces that wash brush 6 can pivot out back and forth as well as laterally to the direction of movement of the vehicle traveling through the car wash facility, this being assured even in corner areas of the vehicle by the position of articulation axis 5 and brush pivot axis 7 at an angle of 30-60° relative to one another.

FIG. 3 shows a second embodiment of articulated connection 4 that differs from the embodiment of FIG. 2 substantially only by the design of lower part 4b of articulated connection 4. Lower part 4b is designed in this embodiment as web 13 that is formed on the bottom of upper part 4a and stands at an angle of 30-60° to articulation axis 5. A central bore is provided in web 13, through which an articulation pin extends. The U-shaped upper part of brush carrier 8 is articulated on web 13 by this articulation pin in such a manner that it can pivot about brush pivot axis 7. As a result of the oblique position of web 13 relative to articulation axis 5, even in this embodiment example, articulation axis 5 and brush pivot axis 7 are at an angle of 30-60° to one another.

The invention claimed is:

1. A brush arrangement for a car wash facility with at least one crossbeam, the brush arrangement comprising:
    at least one carrier arm having a first end and a second end opposite the first end, the at least one carrier arm pivotably mounted to the cross beam at the first end;
    an articulated connection pivotably mounted proximate to the second end of the carrier arm, the articulated connection pivotable about a horizontal articulation axis with respect to the at least one carrier arm; and
    a wash brush pivotably mounted to the articulated connection, the wash brush pivotable about a horizontal brush pivot axis,
    wherein the angle formed between the horizontal articulation axis and the horizontal brush pivot axis is between 30° and 60°.

2. The brush arrangement according to claim 1, wherein the wash brush is rotatably mounted on a brush carrier and the brush carrier is articulated to the lower end of the articulated connection in such a manner that it can pivot about the brush pivot axis.

3. The brush arrangement according to claim 1, wherein dampers are provided for damping the pivoting motion of the articulated connection and/or of the wash brush.

4. A process for cleaning a vehicle in a car wash facility with the brush arrangement according to claim 1, with the following sequences:
    a. The driving of a vehicle into the car wash facility, during which the wash brush hangs freely downward and rotates on the articulated connection located in its start position and the carrier arm is located in a central position on the crossbeam;
    b. Pivoting out of the horizontal articulation axis to the front in the direction of the movement of the vehicle as soon as the front end of the vehicle bumps against the wash brush, as a result of which the wash brush is moved out of its vertical position obliquely to the front;

c. As the vehicle is driven in further, the carrier arm on the crossbeam is pivoted from a central position into a side edge position until the wash brush has reached the side edge of the front of the vehicle and at the same time the wash brush resting on the front of the vehicle begins to pivot outward about the brush pivot axis to the side surface of the vehicle, during which the brush pivot axis encloses an angle of 30-60° with the articulation axis;

d. As the vehicle is driven in farther, the wash brush moves around the front corner of the vehicle, during which the activation member remains in its lateral edge position and the wash brush comes to rest on the side surface of the vehicle, during which it can pivot about the brush pivot axis in a direction vertical to the direction of movement of the vehicle and can thus follow the side contour of the vehicle while the vehicle moves farther;

e. Upon reaching the rear of the vehicle, the wash brush moves around the rear corner of the vehicle, during which the carrier arm moves back into its central position on the crossbeam and the wash brush slides along the rear of the vehicle;

f. The articulated connection pivots back about the articulation axis and the wash brush pivots back about the brush pivot axis into their start positions as soon as the wash brush has lost contact with the rear of the vehicle.

5. A brush arrangement for a car wash facility with at least one horizontal crossbeam on which at least one carrier arm is mounted so that it can pivot in a horizontal plane, in which an articulated connection is provided on one end of the carrier arm and is articulated on its upper end in such a manner that it can pivot about a horizontal articulation axis on the carrier arm, and a wash brush is mounted in such a manner on its lower end that it can pivot about a horizontal brush pivot axis, wherein the articulation axis and the brush pivot axis enclose an angle of 30-60° and wherein the articulated connection has a U-shaped upper part and a lower part arranged on it in one piece, which U-shaped upper part surrounds the free end of the carrier arm and is articulated there via a bolt in such a manner that it can pivot.

6. The brush arrangement according to claim 5, wherein the lower part of the articulated connection has pivot surfaces running obliquely at an angle of 30-60° to the shanks of the U-shaped upper part, on which surfaces the upper end of the brush carrier is articulated in such a manner that it can pivot via a bolt about the brush pivot axis.

7. The brush arrangement according to claim 6, wherein the upper end of the brush carrier is U-shaped and that the U shanks surround the lower part of the articulated connection resting on the pivot surfaces.

8. The brush arrangement according to claim 5, wherein the wash brush is rotatably mounted on a brush carrier and the brush carrier is articulated to the lower end of the articulated connection in such a manner that it can pivot about the brush pivot axis.

9. The brush arrangement according to claim 5, wherein dampers are provided for damping the pivoting motion of the articulated connection and/or of the wash brush.

10. A process for cleaning a vehicle in a car wash facility with the brush arrangement according to claim 5, with the following sequences:

a. The driving of a vehicle into the car wash facility, during which the wash brush hangs freely downward and rotates on the articulated connection located in its start position and the carrier arm is located in a central position on the crossbeam;

b. Pivoting out of the horizontal articulation axis to the front in the direction of the movement of the vehicle as soon as the front end of the vehicle bumps against the wash brush, as a result of which the wash brush is moved out of its vertical position obliquely to the front;

c. As the vehicle is driven in further, the carrier arm on the crossbeam is pivoted from a central position into a side edge position until the wash brush has reached the side edge of the front of the vehicle and at the same time the wash brush resting on the front of the vehicle begins to pivot outward about the brush pivot axis to the side surface of the vehicle, during which the brush pivot axis encloses an angle of 30-60° with the articulation axis;

d. As the vehicle is driven in farther, the wash brush moves around the front corner of the vehicle, during which the activation member remains in its lateral edge position and the wash brush comes to rest on the side surface of the vehicle, during which it can pivot about the brush pivot axis in a direction vertical to the direction of movement of the vehicle and can thus follow the side contour of the vehicle while the vehicle moves farther;

e. Upon reaching the rear of the vehicle, the wash brush moves around the rear corner of the vehicle, during which the carrier arm moves back into its central position on the crossbeam and the wash brush slides along the rear of the vehicle;

f. The articulated connection pivots back about the articulation axis and the wash brush pivots back about the brush pivot axis into their start positions as soon as the wash brush has lost contact with the rear of the vehicle.

11. A brush arrangement for a car wash facility, comprising:

at least one carrier arm having a first end and a second end opposite the first end, the at least one carrier arm pivotably mounted to a surface of the car wash facility at the first end about a carrier arm axis;

an articulated connector having first and second portions, the first portion pivotably mounted to the at least one carrier arm proximate the second end about an articulation axis, the second portion pivotably mounted to the first portion about a brush pivot axis, the brush pivot axis forming an angle with respect to the articulation axis; and at least one car wash tool mounted to the second portion of the articulated connector, the at least one car wash tool thereby configured to pivot about the articulation axis and to pivot about the brush pivot axis, wherein the angle formed between the articulation axis and the brush pivot axis is between 30° and 60°.

12. The brush arrangement of claim 11, the articulation axis is perpendicular to a longitudinal axis of the carrier arm, the longitudinal axis extending from the carrier arm first end to the carrier arm second end.

13. The brush arrangement according to claim 11, wherein the articulation axis and the brush pivot axis are substantially horizontal with respect to a floor of the car wash facility.

14. The brush arrangement according to claim 13, wherein the surface of the car wash facility is a crossbeam which is oriented substantially horizontally with respect to the floor of the car wash facility.

15. The brush arrangement according to claim 11, wherein the at least one wash tool is a wash brush.

16. The brush arrangement according to claim 11, wherein the at least one car wash tool has a substantially vertical orientation when not spinning in contact with a vehicle, with respect to the floor of the car wash facility.

17. The brush arrangement according to claim 11, wherein the at least on car wash tool is pivotable and rotable to move from a first side of a vehicle to a second side of the vehicle as the vehicle pushes the car wash tool.

* * * * *